(12) United States Patent
Gillihan et al.

(10) Patent No.: US 6,385,346 B1
(45) Date of Patent: *May 7, 2002

(54) METHOD OF DISPLAY AND CONTROL OF ADJUSTABLE PARAMETERS FOR A DIGITAL SCANNER DEVICE

(75) Inventors: Thomas M. Gillihan; Larry Alan Westerman, both of Portland, OR (US)

(73) Assignee: Sharp Laboratories of America, Inc., Camas, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,201

(22) Filed: Aug. 4, 1998

(51) Int. Cl.$^7$ ................................................ H04N 1/04
(52) U.S. Cl. ........................................ 382/254; 382/266
(58) Field of Search ............................... 382/254–258, 382/266, 199–200; 358/519

(56) References Cited

U.S. PATENT DOCUMENTS

| | | | |
|---|---|---|---|
| 4,268,165 A | 5/1981 | Bradmon | 355/55 |
| 4,310,237 A | 1/1982 | Gengelbach | 355/14 |
| 4,350,435 A | 9/1982 | Fiske et al. | 355/14 |
| 4,706,131 A | 11/1987 | Perten et al. | 358/302 |
| 4,807,045 A | 2/1989 | Shimano | 358/282 |
| 4,910,557 A | 3/1990 | Imai | 355/246 |
| 4,937,682 A | 6/1990 | Dalton | 358/461 |
| 4,965,634 A | 10/1990 | Bando | 355/208 |
| 5,298,944 A | 3/1994 | Sawayama et al. | 355/208 |
| 5,311,261 A | 5/1994 | Nakagama et al. | 355/246 |
| 5,333,037 A | 7/1994 | Inoue et al. | 355/203 |
| 5,469,244 A | 11/1995 | Ogata et al. | 355/246 |
| 5,539,426 A * | 7/1996 | Nishikawa et al. | 345/115 |
| 5,880,858 A * | 3/1999 | Jin | 358/487 |
| 5,900,950 A * | 5/1999 | Hsu | 358/497 |
| 6,128,013 A * | 10/2000 | Prabhu et al. | 345/337 |
| 6,188,807 B1 * | 2/2001 | Arakawa | 382/319 |

* cited by examiner

Primary Examiner—Thomas D. Lee
Assistant Examiner—Stephen Brinich
(74) Attorney, Agent, or Firm—Chernoff, Vilhauer, McClung & Stenzel, LLP

(57) ABSTRACT

In a method for image processing, an image is scanned. A first portion of the image is displayed based at least in part upon a first value of a first adjustable parameter, where the first parameter affects the appearance of the image. A second portion of the image is simultaneously displayed based at least in part upon a second value of the first parameter, where the second value is different from the first value. A first processing value is selected based upon at least one of the first value and second value. The image is processed in accordance with the first processing value. In one aspect of the method, the first portion of the image is displayed adjacent to the second portion of the image. In another aspect of the method, the first parameter is selected from the group consisting of density, contrast, focus, edge enhancement, and gamma correction.

15 Claims, 3 Drawing Sheets

METHOD OF DISPLAY AND CONTROL OF ADJUSTABLE PARAMETERS FOR A DIGITAL SCANNER DEVICE

BACKGROUND OF THE INVENTION

The present invention relates to method and apparatus for manipulating or enhancing the image signal that is provided by a document scanner or other image capturing device. More specifically, the invention provides operator control and enhancement of the digital image signal that results from a document scanning process or apparatus. Further, the present invention may be used with copiers, and/or printer-copiers which also provide a digital image signal.

In a conventional scanner a document is scanned to create a digital representation of the document. One such method and apparatus for scanning is described in U.S. Pat. No. 4,937,682. The scanning process converts the visual image of the document into a digital image signal. The digital image signal can be used in many ways, for example, the image signal can be transmitted to remote locations for storage or for reproduction by a printer, or the image signal can be manipulated in a manner to enhance or change the image, or the image can be merged with other images.

One problem associated with the document scanning process is that the initial scan of a document usually does not result in the preferred appearance of the image of the scanned document. Documents which present particular difficulties for scanning comprise a black image and/or shades of gray on a white background. More generally, the document image may comprise colored line text images, and/or color-scale pictorial images on a different color background substrate, such as paper.

The appearance of the scanned image depends on a variety of scanning parameters, such as density, contrast, focus, or other physical aspects of the scanning process. In addition, the appearance of the image may further be dependent on image processing functions such as edge enhancement, gamma correction, or other algorithmic manipulations of the raw image data. Usually, users of the scanning apparatus wish to adjust the scanning parameters and/or the image processing functions to obtain the preferred appearance of the image.

However, the conventional method for optimizing these parameters is slow and tedious. A conventional scanning apparatus typically displays the results of an initial scan on a video display. Such a prior art video display is depicted in FIG. 2. The display 16a shows the image 30, together with the values of one or more scanning and/or image processing parameters, shown as bar graphs 32, 34, 36, and 38. After viewing the display of an initial scan, the user typically adjusts one or more of these parameters, and then re-scans the image. Alternatively, the change in parameter may be affected through digital processing. In either case, a second appearance of the image is presented based on the change in the parameter value(s). After viewing the results of the second scan, the user may then continue attempting to optimize the appearance of the image by adjusting the parameter values until a final set of parameter values is selected.

This method of selecting parameter values to produce the preferred image results in a wasteful trial-and-error method of attempting to find the best combination of many different parameter values. For example, the selection of the optimal combination of values for the parameters of contrast and density for an image can be tedious and time consuming. The initial scan uses initial values for the contrast and density parameters. The initial display of the scanned image shows the appearance of the image based upon the initial contrast and density values. The value of the contrast parameter may then be changed, and a resulting new appearance may be displayed after scanning. Changes to the value of the contrast parameter, however, may require changes to the value of the density parameter to optimize the appearance of the image. Thus, the value of the density parameter may then be changed, and a third appearance may be displayed after scanning. This change to the value of the density parameter may require another change to the value of the contrast parameter, to again determine whether the appearance of the image is optimal after scanning. Thus, attempting to select the optimal combination of values for the contrast and density parameters may involve many different selections of different combinations of values for these parameters in an attempt to find the optimal appearance.

What is desired, therefore, is a system by which the user may be quickly presented with the results of variations in the adjustment of the image parameters, and by which the user may subjectively select a particular set or sets of adjustments to these parameters.

SUMMARY OF THE INVENTION

The present invention takes the form of a method for image processing. An image is scanned or otherwise acquired and a first portion of the image is displayed based at least in part upon a first value of a first adjustable parameter, where the first parameter affects the appearance of the image. A second portion of the image is simultaneously displayed based at least in part upon a second value of the first parameter, where the second value is different from the first value. A first processing value is selected based upon at least one of the first value and second value. The image is then processed in accordance with the first processing value.

In the preferred embodiment, the first portion of the image is displayed adjacent to the second portion of the image. Also, the first parameter is selected from the group consisting of density, contrast, focus, edge enhancement, and gamma correction.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
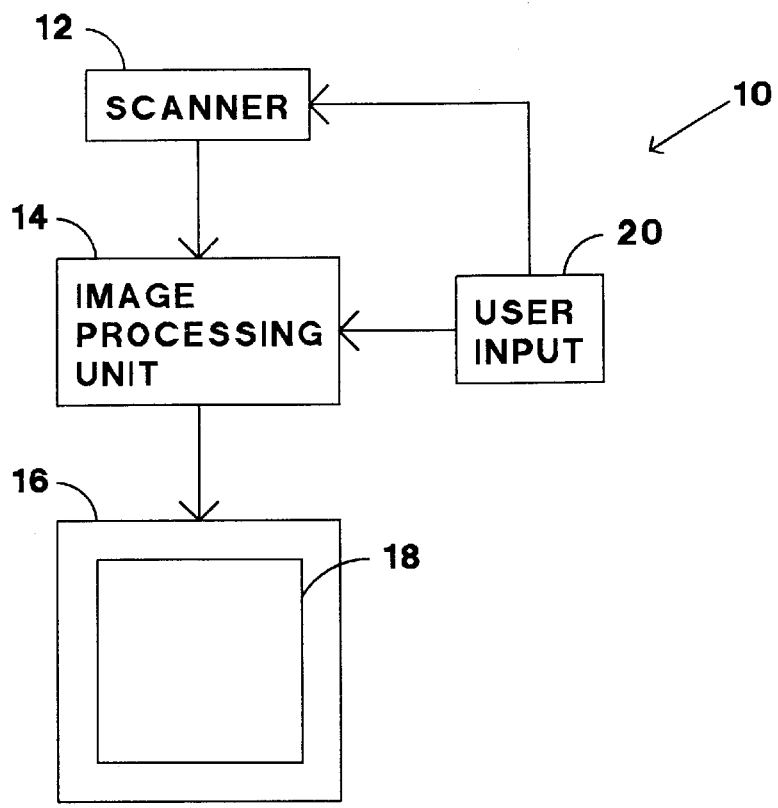
FIG. 1 is a block diagram illustrating the structural organization of a system according to the present invention.

A system for setting user adjustable image processing parameters in a scanning system is shown schematically at 10 in FIG. 1. System 10 includes a scanner 12 which is adapted to scan an image from a document. Scanner 12 converts the visual image contained in the document into a digital signal image form that is usable by data processing machines and the like. U.S. Pat. No. 4,937,682 describes a typical document scanning machine. While FIG. 1 shows a system employing a scanner, the present invention is not limited to scanners, but also may be used with other imaging devices such as printer-copiers or copiers. System 10 also includes an image processing unit 14 which is connected to scanner 12. Processing unit 14 is adapted to process a signal to create an appearance 18 of the image for display on the video display 16.

The appearance 18 of the image on the video display 16 is dependent on the value of one or more user adjustable parameters. The scanning process involves several physical variables which may affect the appearance of the image. The variable scanning parameters may include contrast, density, or focus. Density refers to the absolute black levels of the image. Contrast is the normalization of density, and is the difference between the black level and white level divided by the white level [(black level—white level)/(white level)]. The scanner 12 normally allows adjustment of at least the density and contrast parameters, and may include adjustments for other physical processing parameters.

In addition, the appearance 18 of the image on the video display 16 may also be dependent on image processing functions such as edge enhancement and gamma correction, or other algorithmic manipulation of the raw image data which may alter the appearance of the scanned image. The user adjustable image processing parameters are used in the image processing unit 14 to adjust the properties for the image in a fashion corresponding to the value of the particular parameter. Each of the various parameters has a corresponding modification function that the image processing unit 14 applies during processing. The parameter values themselves thus represent a scale factor for incorporation into a particular modification function. The modification functions are well known in the art and not directly relevant to the present invention.

System 10 includes a user input mechanism 20 connected to the image processing unit 14 and to the scanner 12 to allow a user to adjust the various scanning and/or image processing parameters. The user input mechanism 20 typically takes the form of a keyboard or mouse which allows adjustment of the user adjustable parameters, although other types of input mechanisms could be used as well.

Figure 3:
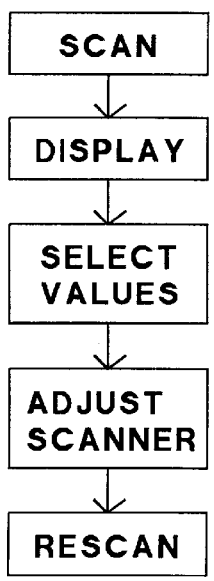
FIG. 3 shows a block diagram illustrating a method of the present invention.

FIG. 3 shows a block diagram of one method of the present invention. The scanner 12 is adjusted during the scan to change the values of one or more adjustable parameters. These parameters affect the appearance of the image. The scanner 12 scans a first portion of the image using a first value of the user adjustable parameter. The scanner 12 then scans a second portion of the image using a second value of the user adjustable parameter. The first portion of the image is then displayed on display 16, and the second portion of the image is simultaneously displayed adjacent to the first portion of the image. The user may then directly compare the first portion of the image to the second portion of the image. Based upon which portion is preferred, the user selects a processing value based upon at least one of the first value and second value of the adjustable parameter. The entire image is then rescanned using the selected processing value.

Figure 4:
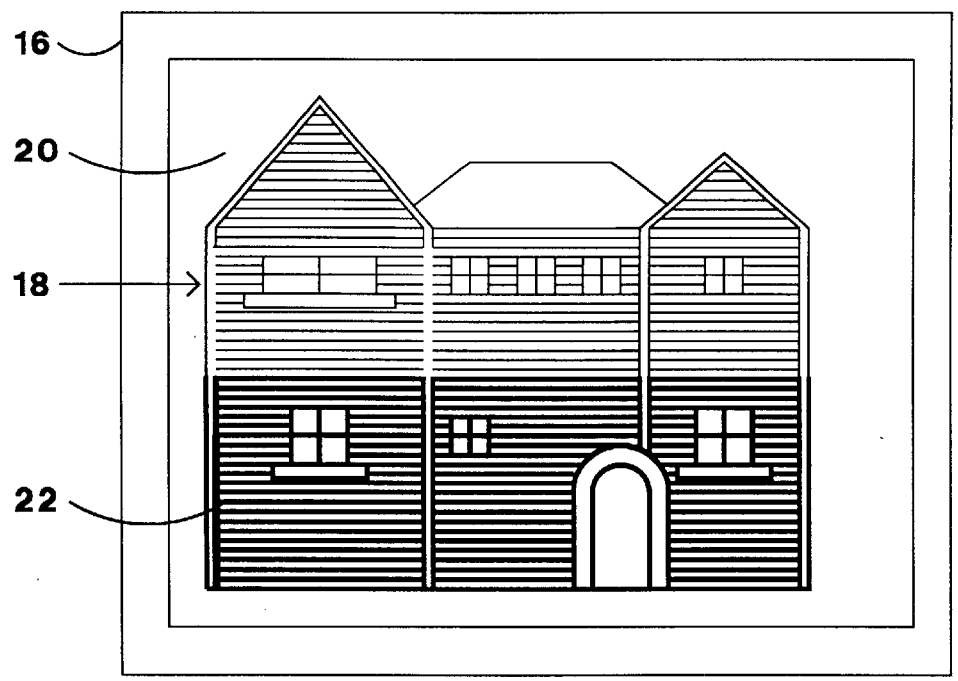
FIG. 4 shows a display of the current invention illustrating the appearance of an image based upon two different values of one adjustable parameter.

By way of example, a scanner scans a first portion of an image using a contrast value of 50 for a first portion of the image. The second portion of the image is scanned using a contrast value of 100. The two portions are displayed simultaneously adjacent to each other. FIG. 4 illustrates the display. FIG. 4 shows a display 16 displaying the first portion 20 and the second portion 22 of an image. The second portion of the image is preferred, so the contrast value of 100 is selected. The entire image is then rescanned using a contrast value of 100.

The user adjustable parameters may be varied either horizontally or vertically. Further, more than one parameter may be varied in a single scan. Accordingly, two parameters may be adjusted to display the affects of various combinations of parameters on the appearance of an image. Thus, in a further aspect of the invention, an image is scanned by varying a first adjustable parameter vertically, and by varying a second adjustable parameter horizontally.

By way of example, an image is scanned. A first portion of an image is displayed based on a first value of the first adjustable parameter, and a first value of the second adjustable parameter. A second portion of the image is displayed based on a second value of the first adjustable parameter, and the first value of the second adjustable parameter. A third portion of the image is displayed based on the first value of the first adjustable parameter, and a second value of the second adjustable parameter. A fourth portion of the image is displayed based on the second value of the first adjustable parameter, and the second value of the second adjustable parameter. The four portions of the image are simultaneously displayed adjacent to each other, allowing a user to see the appearance of the image based on four different combinations of two user adjustable parameters. The user then selects a first processing value based upon at least one of the first value and second value of the first parameter, and selects a second processing value based upon at least one of the first value and second value of the second parameter. The entire image is then rescanned using the first and second processing values, to create an image based upon the first and second processing values.

As can be seen, the method of the present invention allows the use of two or more values for each of the user adjustable parameters. Accordingly, n values could be selected for the first adjustable parameter and varied horizontally, and m values could be selected for the second adjustable parameter and varied vertically. The display would display a matrix of n×m image portions simultaneously. The number of n and m values for the two parameters would be limited only by the resolution of the scanning device and display. The display may display the portions of the image directly adjacent to each other, or may separate the portions by solid lines or spaces.

Figure 5:
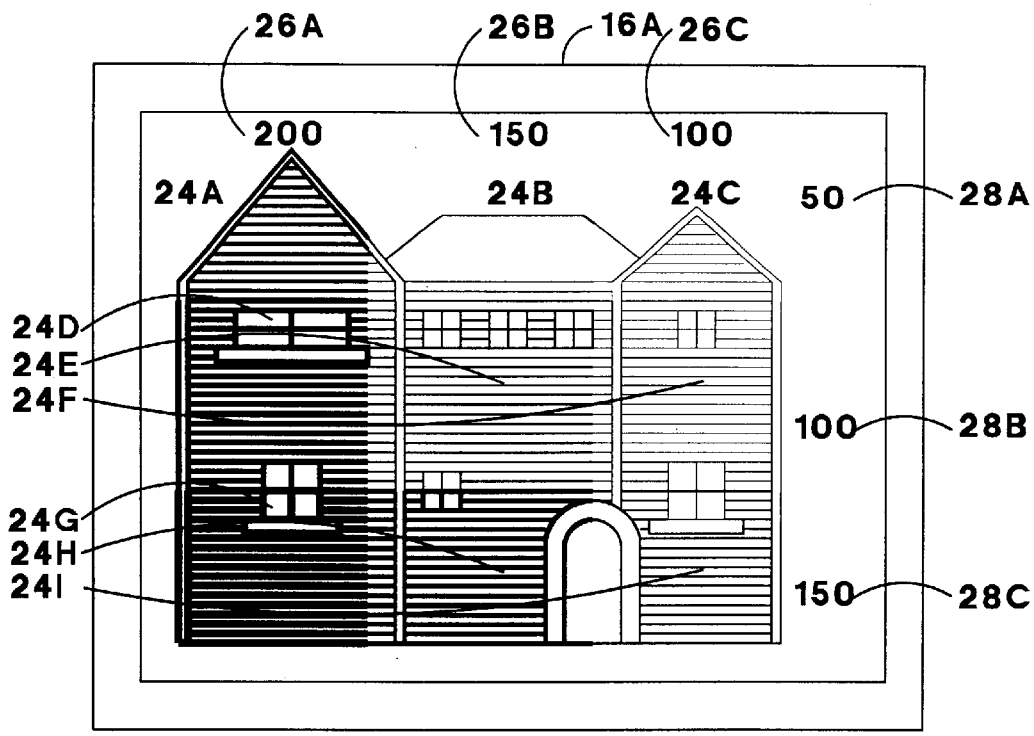
FIG. 5 shows a display of the current invention illustrating the appearance of an image based on a range of values for two adjustable parameters.

FIG. 5 illustrates a display using the adjustable parameters of density and contrast. A scan is made varying the values for density horizontally and the values for contrast vertically. The appearance 18 on display 16 thus presents a total of nine portions of the image shown as 24a–24i, each portion representing one combination of values of the adjustable parameters of contrast and density. The values for the density parameter 26a–26c are simultaneously displayed adjacent to the three columns. In the present example, the density values are 200, 150, and 100. The values for the contrast parameter 28a–28c are also simultaneously displayed along the three rows. In the present example, the contrast values are 50, 100, and 150. The user may select the preferred image portion, or combination of parameter values, such as contrast of 100 and density of 150, corresponding to image portion 24e. The user may then set the scanner with those values, and scan the entire image again.

In a preferred embodiment, the user selects a center value and a range for one or two of the adjustable parameters. The scanner then scans the image using the various ranges for the one or two parameters. Each portion of the image is displayed simultaneously, each portion using one combination of the values for the adjustable parameters. The parameter values may then be overlaid, or displayed simultaneously, with the image. FIG. 5 shows the simultaneous display of the parameter values of density and contrast with the portions of the image. As a result, the user may quickly select an optimal set of parameters for the particular document or image being scanned.

Figure 6:
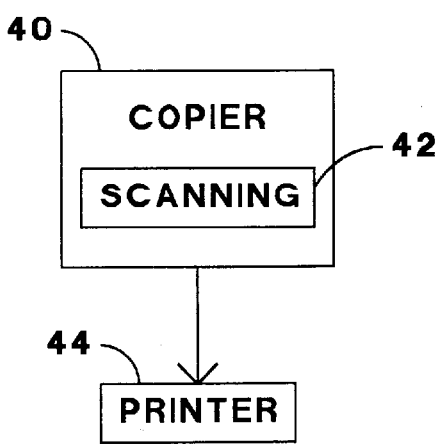
FIG. 6 shows a block diagram of an alternative method of the present invention.
Figure 2:
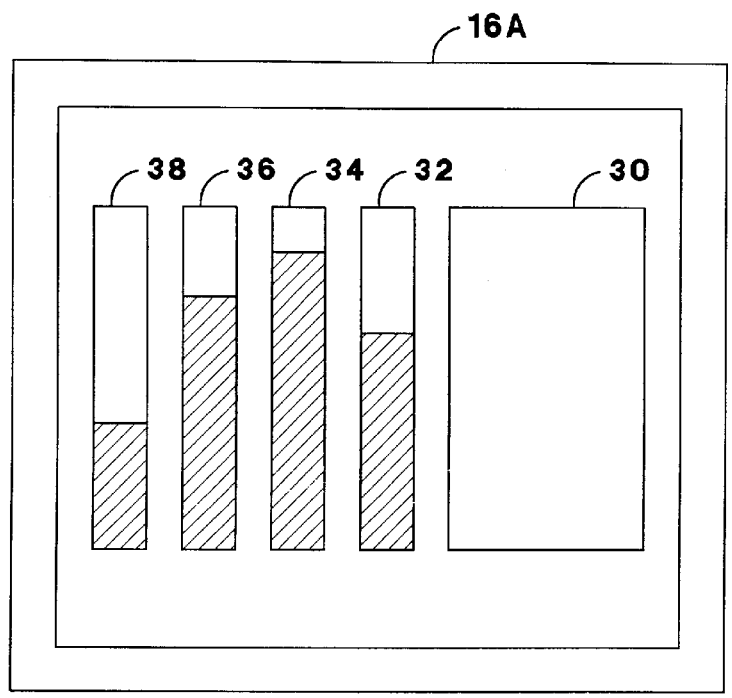
FIG. 2 shows a prior art display of the appearance of a scanned image.

While the above discussion has dealt with a scanner, it will be recognized that the present invention may be used with any parameter adjustable image processing system. For example, the method of the present invention may be used with copiers or printer-copiers, which are adapted to create images which may be processed. FIG. 6 shows such an alternative system within the scope of the present invention. A copier 40 has a surface for receiving a document having an image. The copier 40 has a scanning system 42 for creating an electronic signal of the image. A printer 44 prints the image onto a piece of paper from the electronic image. The appearance of the image on the printed paper is dependent on such user adjustable parameters as contrast and density. After an initial scan during which one or more parameters are varied in value, the image portions are printed on a sheet of paper, each image portion based on a particular combination of values of the user adjustable parameters. The optimal image is selected, thus selecting the processing values for the adjustable parameters. The entire image may then be copied and printed using the selected processing values.

Figure 7:
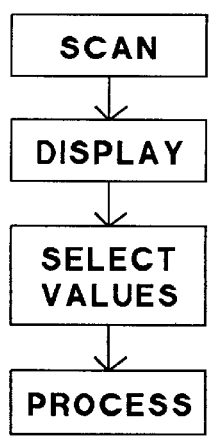
FIG. 7 shows a block diagram of a further alternative method of the present invention.

FIG. 7 illustrates an alternative method within the scope of the present invention. In this method, an image is scanned. During the scanning processing, one or more user adjustable parameters is varied. The various portions of the image are displayed in matrix form as described above. The optimum combination of parameters is then selected. However, instead of rescanning the image using the selected processing values, the image is processed digitally with conventional image processing software using the selected processing values.

Figure 8:
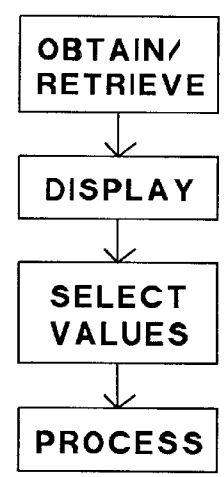
FIG. 8 shows a block diagram of a further alternative method of the present invention.

FIG. 8 illustrates a further alternative method of the present invention. A digital representation of an image that has been scanned or otherwise created is retrieved. A series of portions of the image is then displayed by varying one or more user adjustable parameters that affect the appearance of the image. Each portion of the image displays one combination of the user adjustable parameters. The image portions are displayed simultaneously and adjacent to each other. The optimum combination of parameters is selected to determine the values for the processing values. The image is then digitally processed using the selected processing values.

By way of example, a scanned image is retrieved from a memory storage device. An image processing unit processes the image using three values for contrast and three values for density. The values for contrast for three columns are 200, 150 and 100 respectively. The values for density for three rows are 50, 100, and 150. The display simultaneously displays the nine portions of the image, as in FIG. 5. Each portion of the image represents a particular combination of user adjustable parameters. The user selects the optimal combination of contrast of 100 and density of 50 for the processing values. The image processing unit then processes the image using the selected processing values.

Yet a further technique involves the process of scanning or otherwise obtaining an image. Then the image is displayed using a combination of physical scanner parameters and post-processing software parameters. The image is rescanned using the physical scanned parameters and subsequently post-processed to obtain the final image. No redisplay of the image prior to post processing is necessary.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for image processing comprising the steps of:
    (a) scanning an image using a scanning device including resetting a first adjustable parameter of said scanning device during said scanning between a first value and a second value different than said first value, wherein said resetting is performed after at least a portion of said image is scanned and before the entire said image is scanned, said first parameter affecting the appearance of said image;
    (b) displaying a first portion of said image based at least in part upon said first value;
    (c) simultaneously displaying a second portion of said image based at least in part upon said second value;
    (d) selecting a processing value based upon at least one of said first value and said second value; and
    (e) rescanning said image using said scanning device in accordance with said processing value.

2. The method of claim 1 wherein said first portion of said image is displayed adjacent to said second portion of said image.

3. The method of claim 1 wherein said first parameter is selected from the group consisting of density, contrast, and focus.

4. The method of claim 1, further comprising the step of displaying said first value of said first parameter and said second value of said first parameter while simultaneously displaying said first and second portions of said image.

5. The method of claim 1 wherein a photocopier performs the step of scanning said image and said first and second portions of said image are displayed on a sheet of paper.

6. The method of claim 1 wherein said scanning is performed using a scanner and said first and second portions of said image are displayed on a video display.

7. The method of claim 1, further including the step of selecting said first value of said first parameter and said second value of said first parameter prior to said scanning said image.

8. A method for image processing comprising the steps of:
    (a) scanning an image, the appearance of said image being dependent upon a first user adjustable parameter and a second user adjustable parameter;
    (b) simultaneously displaying a plurality of different portions of said image, said different portions each based on a different combination of values of said first and second user adjustable parameters, including arranging said different portions so that different portions separated horizontally represent combinations having different values for said first user adjustable parameter and different portions separated vertically represent combinations having different values for said second user adjustable parameter;

(c) selecting first and second processing values based upon one of said different portions of said image; and (d) processing said image in accordance with said first and second processing values.

9. The method of claim 8 wherein said first and second user adjustable parameters are chosen from the group consisting of density, contrast, and focus.

10. The method of claim 8, further comprising the step of displaying said values of said first user adjustable parameter and said second user adjustable parameter while simultaneously displaying respective said portions of said image.

11. The method of claim 8 wherein said each of said portions of said image is displayed adjacent to another portion of said image.

12. A method for image processing comprising the steps of:

(a) acquiring an image using an image capturing device including resetting a first adjustable parameter of said device during said acquiring between a first value and a second value different than said first value, wherein said resetting is performed after at least a portion of said image is acquired and before the entire said image is acquired, said first parameter affecting the appearance of said image;

(b) displaying a first portion of said image based at least in part upon said first value;

(c) simultaneously displaying a second portion of said image based at least in part upon said second value;

(d) selecting a processing value based upon at least one of said first value and said second value; and (e) reacquiring said image using said device in accordance with said processing value.

13. The method of claim 12 wherein said first portion of said image is displayed adjacent to said second portion.

14. The method of claim 12 wherein said first value and said second value are displayed simultaneously with said first and second portions of said image.

15. The method of claim 12 wherein said first parameter is selected from the group consisting of density, contrast, and focus.

* * * * *